United States Patent
Khanfouci et al.

(10) Patent No.: US 11,490,274 B2
(45) Date of Patent: Nov. 1, 2022

(54) METHOD FOR MANAGING FRONTHAUL NETWORK, APPARATUS, COMPUTER PROGRAM PRODUCT, AND DATA SET

(71) Applicant: MITSUBISHI ELECTRIC CORPORATION, Tokyo (JP)

(72) Inventors: Mourad Khanfouci, Rennes (FR); Herve Bonneville, Rennes (FR); Loic Brunel, Rennes (FR)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 70 days.

(21) Appl. No.: 17/252,916

(22) PCT Filed: Aug. 23, 2019

(86) PCT No.: PCT/JP2019/034032
§ 371 (c)(1),
(2) Date: Dec. 16, 2020

(87) PCT Pub. No.: WO2020/045603
PCT Pub. Date: Mar. 5, 2020

(65) Prior Publication Data
US 2021/0266764 A1 Aug. 26, 2021

(30) Foreign Application Priority Data
Aug. 28, 2018 (EP) .................................... 18306140

(51) Int. Cl.
*H04W 24/02* (2009.01)
*H04W 40/24* (2009.01)
*H04W 64/00* (2009.01)

(52) U.S. Cl.
CPC ......... *H04W 24/02* (2013.01); *H04W 40/248* (2013.01); *H04W 64/003* (2013.01)

(58) Field of Classification Search
CPC ............... H04W 72/042; H04W 24/10; H04W 72/0413; H04W 48/16; H04W 88/02;
(Continued)

(56) References Cited

U.S. PATENT DOCUMENTS

2016/0242147 A1 8/2016 Tarlazzi et al.
2017/0272931 A1 9/2017 Bottari et al.
(Continued)

FOREIGN PATENT DOCUMENTS

WO    WO 2015/044871 A1    4/2015

OTHER PUBLICATIONS

Japanese Office Action for Japanese Application No. 2020-568350, dated Feb. 1, 2022, with English translation.

*Primary Examiner* — Kwasi Karikari
(74) *Attorney, Agent, or Firm* — Birch, Stewart, Kolasch & Birch, LLP

(57) ABSTRACT

A method for managing a fronthaul network in a wireless communication system, the fronthaul network comprising several distributed units and one or more central units, is proposed. The method comprises: performing fronthaul network dynamic configuration on the fronthaul network, the fronthaul network dynamic configuration comprising, at a controller of the wireless communication system: obtaining information indicating a positioning of the mobile terminal, obtaining, based on the information indicating a positioning of the mobile terminal, a set of one or more active distributed units among the plurality of distributed units, determining first associations between each of the active distributed units and one or more first respective central units of the one or more central units, and configuring communication links between each of the active distributed units and their first respective one or more central units according to the determined first associations.

14 Claims, 9 Drawing Sheets

(58) Field of Classification Search
CPC . H04W 52/0209; H04W 72/02; H04W 36/14; H04W 48/18; H04W 76/15; H04W 52/0212; H04W 8/005; H04W 28/0268; H04W 28/08; H04W 48/20; H04W 36/08; H04W 40/246; H04W 76/11; H04W 76/30; H04W 52/04; H04W 88/18; H04W 88/085; H04W 36/0088
See application file for complete search history.

(56) References Cited

U.S. PATENT DOCUMENTS

| | | | |
|---|---|---|---|
| 2017/0289854 A1* | 10/2017 | Chang | H04W 36/005 |
| 2018/0049078 A1 | 2/2018 | Yang et al. | |
| 2018/0249375 A1* | 8/2018 | Goldhamer | H04L 1/1812 |
| 2018/0279182 A1* | 9/2018 | Sang | H04W 36/0055 |
| 2018/0287696 A1* | 10/2018 | Barbieri | H04W 36/08 |

* cited by examiner

METHOD FOR MANAGING FRONTHAUL NETWORK, APPARATUS, COMPUTER PROGRAM PRODUCT, AND DATA SET

TECHNICAL FIELD

The present disclosure relates to the field of wireless network management, in particular the management of High Speed Train (HST) communication networks.

BACKGROUND ART

In current wireless communication systems, the access network or radio access network may comprise a so-called "fronthaul network," which is a network wherein centralized and distributed units that provide high-level functions (also known as "RRM units" or "Radio Resource Management units") are communicatively connected to so-called radio units providing low-level functions. The design of a fronthaul network may be based on a communication interface between RRM units and radio units specified as a common public radio interface (CPRI) interface. CPRI is an industry standard that defines an internal interface that splits a radio access node (e.g., a base station) of a radio access network into a central unit (CU) and one or more distributed units (DU). A CU may sometimes be referred to as a Baseband Unit (BBU), or as a Radio Equipment Control (REC), while a DU may sometimes be referred to as a Remote Radio Head (RRH), or Radio Equipment (RE). The CPRI has been specifically designed to transmit digitized base band signalling between the CUs and the DU units, leaving all layer 2 and layer 3 operations in the CU.

Evolved fronthaul architectures are considering packet transmission of CPRI signals using the Ethernet protocol, wherein data transmitted over a CPRI interface used in a fronthaul network is packetized and transmitted via Ethernet packets. Advantages of an Ethernet-based fronthaul include the use of packet transmission, including associated signalling, instead of the in-phase quadrature (IQ) data block signalling of traditional CPRI, which improves the routing of the packets over the fronthaul network, the throughput granularity, and allows protecting the transmission of data between a CU and a DU by means of Ethernet packet retransmissions through ARQ signalling.

However, a drawback of current network architectures that use Ethernet over CPRI is that they use Ethernet switches, which are fixed switches which cannot be reconfigured in an efficient manner, in particular to adapt to changing network throughput and network resiliency requirements.

Such drawback may prove to be very problematic in specific contexts such as that of fronthaul networks for railway communications (e.g., fronthaul networks deployed alongside railways), in particular for railway communications with one or more user equipments onboard high speed trains (HST), which require to cope with fast CPRI traffic variations and/or to improve the fronthaul network resilience. These requirements are difficult to address with standard Ethernet switches and the related Ethernet protocol suite.

As a consequence, HST communication networks in which Ethernet over CPRI is implemented in the fronthaul network face such drawbacks. In this regard, FIG. 1 shows a conventional HST communication system 1 which comprises a wireless network system based on the Long Term Evolution (LTE) technology. The wireless network system comprises a radio access network 2 connected to a core network 3 through a S1 interface. The radio access network 2 comprises a plurality of base stations (also referred to as eNodeBs), each eNodeB comprising a central unit CU #1-CU #6 connected to a respective distributed unit DU1-DU6 through a CPRI interface over which Ethernet packets are exchanged. A LTE User Equipment (5) mounted onboard the train 5a is in data communication with the wireless network system, through the distributed units DU3 and DU5.

The set of CPRI interfaces between the central units CU #1-CU #6 and the respective distributed units DU1-DU6 may be seen as a fixed Ethernet switch. This exemplary conventional architecture is not resource efficient nor scalable since it overestimates the resources needed for communicating with the HST. Indeed, it is not resource efficient since the fronthaul network deployment will typically be dimensioned for an expected maximum traffic density of the trains. It is also not scalable because the fixed Ethernet switch should be updated each time additional distributed unit(s) and/or central unit(s) are added to the fronthaul network. In particular, the architecture shown on FIG. 1 may overestimate the resources needed for communicating with the HST, since the fixed Ethernet switch is configured to provide data during a worst case scenario for performance of the HST communication network, which typically results in over-estimating resources as compared to the resources needed for regular fronthaul network operation regimes. In addition, this architecture lacks resiliency since failures in the radio access network may lead to performance and/or security losses. This architecture is also not reactive to changes because of the static nature of the radio access network architecture.

The above-mentioned drawbacks are particularly salient in railway communication networks wherein data communication is to be provided between a fronthaul network and one or several high-speed trains, as the high speed of HSTs increase the over-estimating of resources and the CPRI traffic variations and, as a consequence, the need for improved resource management and for network resilience.

There is therefore a need for providing a method for wireless network management and a network node implementing the same that address the above-described drawbacks and shortcomings of the conventional technology in the art.

There is a further need for providing a method for wireless network management and a network node implementing the same that address the above-described drawbacks and shortcomings of the conventional technology in the art in the specific context of railway communication networks, in particular HST communication networks.

There is a further need for providing a method for wireless network management and a network node implementing the same with an improved resource management and/or and improved network resilience.

There is a further need for providing a method for wireless network management and a network node implementing the same with an improved resource management and/or and improved network resilience in the specific context of railway communication networks, in particular HST communication networks.

It is an object of the present subject disclosure to provide an improved method for wireless network management and network node implementing the same.

Another object of the present subject disclosure is to provide an improved method for wireless network management and network node implementing the same for alleviating the above-described drawbacks and shortcomings of conventional systems.

Yet another object of the present subject disclosure is to provide an improved method for wireless monitoring and network node implementing the same for alleviating the drawbacks and shortcomings of conventional train communication systems.

To achieve these objects and other advantages and in accordance with the purpose of the present subject disclosure, as embodied and broadly described herein, in one aspect of the present subject disclosure, a method for managing a fronthaul network in a wireless communication system, the fronthaul network comprising several distributed units and one or more central units, wherein each distributed unit of the several distributed units is configured to provide, under the control of a central unit of the one or more central units, wireless communication of data between a mobile terminal and the fronthaul network, is proposed. The method comprises: performing fronthaul network dynamic configuration on the fronthaul network, the fronthaul network dynamic configuration comprising, at a controller of the wireless communication system: obtaining information indicating a positioning of the mobile terminal, obtaining, based on the information indicating a positioning of the mobile terminal, a set of one or more active distributed units among the plurality of distributed units, wherein the one or more active distributed units are usable by the mobile terminal for wireless communication with the fronthaul network, determining first associations between each of the active distributed units and one or more first respective central units of the one or more central units; and configuring communication links between each of the active distributed units and their first respective one or more central units according to the determined first associations.

SUMMARY OF INVENTION

The proposed method advantageously provides a fast and efficient reconfiguration of a fronthaul network, whether such reconfiguration is required or desired for dynamically adapting the throughput of data communication between the terminal and the fronthaul network, or for dynamically adapting the network resiliency.

In some embodiments, the fronthaul network dynamic configuration may further comprise: transmitting to the mobile terminal fronthaul network configuration information, wherein the fronthaul network configuration information comprises information indicating the set of one or more active distributed units.

Therefore the mobile terminal may advantageously be informed of fronthaul network configuration information, which information may be used to increase the efficiency of the throughput of data communication or network resiliency adaptation.

In some embodiments, the configuring the connections between each of the active distributed units and their respective one or more central units may comprise activating and/or deactivating connections in a matrix of available connections among the several distributed units and one or more central units of the fronthaul network.

In some embodiments, the determining the associations may comprise determining associations that increase a data communication throughput between the mobile terminal and the fronthaul network.

In some embodiments, the fronthaul network dynamic configuration may further comprise: configuring radio parameters of the active distributed units to configure the active distributed units as a Single Frequency Network.

In some embodiments, the determining the associations may comprise determining associations that increase and/or adapt a fronthaul network resiliency for data communications between the mobile terminal and the fronthaul network.

In some embodiments, the measurements received from the mobile terminal may comprise measurements related to a location of the mobile terminal and/or a speed of the mobile terminal, and/or a direction of movement of the mobile terminal.

In some embodiments, the fronthaul network dynamic configuration may be performed iteratively in a fronthaul network dynamic configuration loop. The configuration may therefore be advantageously performed in a repeated manner, so as to dynamically adapt the fronthaul network to traffic change conditions and/or network deployment changes.

In some embodiments, an iteration of the fronthaul network dynamic configuration loop may be executed substantially periodically.

In some embodiments, a trajectory of the mobile terminal may be divided into portions, and an iteration of the fronthaul network dynamic configuration loop may be executed for each portion of the trajectory. In such embodiments, the need for dynamic network configuration according to the present subject disclosure may advantageously be determined for each portion of the mobile terminal trajectory, and a fronthaul network reconfiguration may be performed for the portion according to the corresponding determination. Advantageously, the portions of the trajectory may be defined based on a history of network fronthaul reconfigurations for at least one portion.

In some embodiments, the fronthaul network dynamic configuration may further comprise: obtaining, based on the information indicating a positioning of the mobile terminal, on information indicating a speed of the mobile terminal, and information indicating a direction of movement of the mobile terminal, a set of one or more measurement distributed units among the plurality of distributed units, to be used by the mobile terminal for radio measurements on wireless links between the mobile terminal and the measurement distributed units, and the fronthaul network configuration information may comprise information indicating the set of one or more measurement distributed units.

In some embodiments, the fronthaul network dynamic configuration may further comprise: determining second associations between at least one of the measurement distributed units and one or more second respective central units of the one or more central units, and configuring communication links between each of the at least one measurement distributed units and their second respective one or more central units according to the determined second associations.

In some embodiments, the measurements received from the mobile terminal may comprise radio measurements performed with respect to the one or more measurement distributed units.

In another aspect of the present subject disclosure, an apparatus, the apparatus comprising a processor, a memory operatively coupled to the processor, and network interfaces to communicate in a wireless communication system, wherein the apparatus is configured to perform any of the proposed methods for network management according to the present subject disclosure, is proposed.

In yet another aspect of the present subject disclosure, a non-transitory computer-readable medium encoded with executable instructions which, when executed, causes a network node comprising a processor operatively coupled with a memory, to perform any of the proposed methods for network management according to the present subject disclosure, is proposed.

In yet another aspect of the present subject disclosure, a computer program product comprising computer program code tangibly embodied in a computer readable medium, said computer program code comprising instructions to, when provided to a computer system and executed, cause said computer to perform any of the proposed methods for network management according to the present subject disclosure, is proposed.

In yet another aspect of the present subject disclosure, a data set representing, for example through compression or encoding, such a computer program, is also proposed.

It should be appreciated that the present invention can be implemented and utilized in numerous ways, including without limitation as a process, an apparatus, a system, a device, and as a method for applications now known and later developed. These and other unique features of the system disclosed herein will become more readily apparent from the following description and the accompanying drawings.

The present subject disclosure will be better understood and its numerous objects and advantages will become more apparent to those skilled in the art by reference to the following drawings, in conjunction with the accompanying specification.

DESCRIPTION OF EMBODIMENTS

Figure 1:
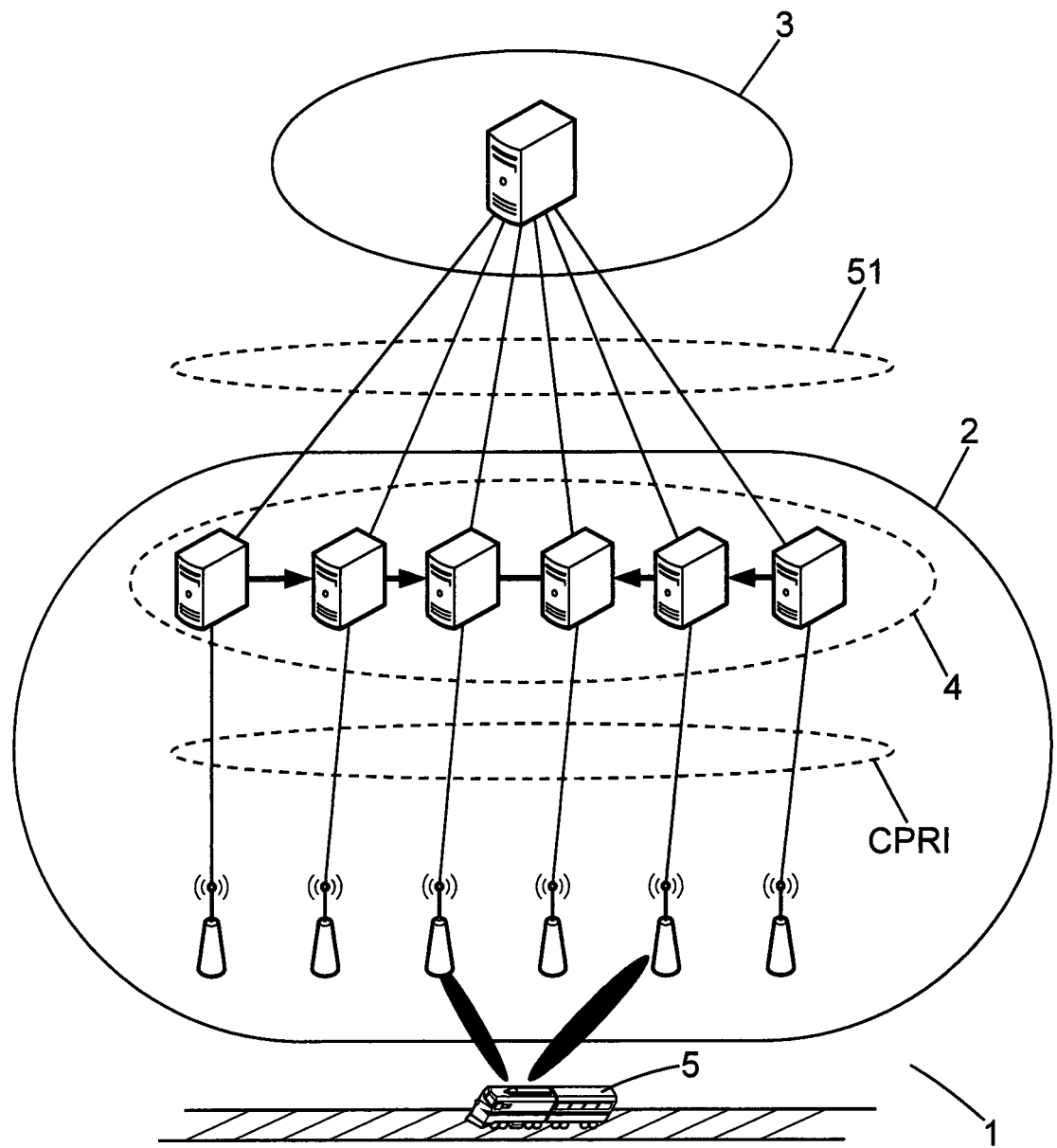
FIG. 1 is a schematic diagram illustrating an overall architecture of an HST communication system according to one or more embodiments.

For simplicity and clarity of illustration, the drawing figures illustrate the general manner of construction, and descriptions and details of well-known features and techniques may be omitted to avoid unnecessarily obscuring the discussion of the described embodiments of the invention. Additionally, elements in the drawing figures are not necessarily drawn to scale. For example, the dimensions of some of the elements in the figures may be exaggerated relative to other elements to help improve understanding of embodiments of the present invention. Certain figures may be shown in an idealized fashion in order to aid understanding, such as when structures are shown having straight lines, sharp angles, and/or parallel planes or the like that under real-world conditions would likely be significantly less symmetric and orderly. The same reference numerals in different figures denote the same elements, while similar reference numerals may, but do not necessarily, denote similar elements.

In addition, it should be apparent that the teaching herein can be embodied in a wide variety of forms and that any specific structure and/or function disclosed herein is merely representative. In particular, one skilled in the art will appreciate that an aspect disclosed herein can be implemented independently of any other aspects and that several aspects can be combined in various ways.

The present disclosure is described below with reference to functions, engines, block diagrams and flowchart illustrations of the methods, systems, and computer program according to one or more exemplary embodiments. Each described function, engine, block of the block diagrams and flowchart illustrations can be implemented in hardware, software, firmware, middleware, microcode, or any suitable combination thereof. If implemented in software, the functions, engines, blocks of the block diagrams and/or flowchart illustrations can be implemented by computer program instructions or software code, which may be stored or transmitted over a computer-readable medium, or loaded onto a general purpose computer, special purpose computer or other programmable data processing apparatus to produce a machine, such that the computer program instructions or software code which execute on the computer or other programmable data processing apparatus, create the means for implementing the functions described herein.

Embodiments of computer-readable media includes, but are not limited to, both computer storage media and communication media including any medium that facilitates transfer of a computer program from one place to another. As used herein, a "computer storage media" may be any physical media that can be accessed by a computer or a processor. In addition, the terms «memory» and "computer storage media" include any type of data storage device, such as, without limitation, a hard drive, a flash drive or other flash memory devices (e.g. memory keys, memory sticks, key drive), CD-ROM or other optical storage, DVD, magnetic disk storage or other magnetic storage devices, memory chip(s), Random Access Memory (RAM), Read-Only-Memory (ROM), Electrically-erasable programmable read-only memory (EEPROM), smart cards, or any other suitable medium from that can be used to carry or store program code in the form of instructions or data structures which can be read by a computer processor, or a combination thereof. Also, various forms of computer-readable media may transmit or carry instructions to a computer, including a router, gateway, server, or other transmission device, wired (coaxial cable, fiber, twisted pair, DSL cable) or wireless (infrared, radio, cellular, microwave). The instructions may comprise code from any computer-programming language, including, but not limited to, assembly, C, C++, Visual Basic, SQL, PHP, and JAVA.

Unless specifically stated otherwise, it will be appreciated that throughout the following description discussions utilizing terms such as processing, computing, calculating, determining, or the like, refer to the action or processes of a computer or computing system, or similar electronic computing device, that manipulate or transform data represented as physical, such as electronic, quantities within the registers or memories of the computing system into other data similarly represented as physical quantities within the memories, registers or other such information storage, transmission or display devices of the computing system.

The terms "comprise," "include," "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

Additionally, the word "exemplary" is used herein to mean "serving as an example, instance, or illustration". Any embodiment or design described herein as "exemplary" is not necessarily to be construed as preferred or advantageous over other embodiments or designs.

In the following description and claims, the terms "coupled" and "connected", along with their derivatives, may be indifferently used to indicate that two or more elements are in direct physical or electrical contact with each other, or two or more elements are not in direct contact with each other, but yet still co-operate or interact with each other.

In the following description and claims, the terms "payload", "payload data", "message", "packet", and "data packet" may be indifferently used, and may include data blocks, data frames, protocol data units or any unit of data that may be routed or transmitted between nodes or stations or across a network. A packet may include a group of bits, which may include one or more address fields, control fields and data, for example. A data block may be any unit of data or information bits.

It should be understood that embodiments of the present subject disclosure may be used in a variety of applications. Although the present invention is not limited in this respect, embodiments of the proposed method for managing an access network node disclosed herein may be used in many apparatuses such as in any network node of a wireless communication system, such as, for example, a wireless communication system using one or more radio technologies, such as Time Division Multiple Access (TDMA), Code Division Multiple Access (CDMA), Frequency Division Multiple Access (FDMA), Orthogonal Frequency Multiple Access (OFDMA), Single-Carrier Frequency Division Multiple Access (SC-FDMA), etc., or any combination thereof. Examples of such wireless communication systems include the Global System for Mobile communications (GSM) system and its evolutions (including the General packet Radio Service (GPRS) system, the Enhanced Data Rate for GSM Evolution (EDGE) system), the Universal Mobile Telecommunication System (UMTS) and its evolutions (including High-Speed Downlink Packet Access (HSDPA), High-Speed Packet Access (HSPA), High-Speed Downlink Packet Access (HSUPA), and High-Speed Downlink/Uplink Packet Access (HSxPA)), the Code Division Multiple Access (CDMA) system and its evolutions (including the CDMA-2000 system), the Long-Term Evolution (LTE) system and its evolutions (including the LTE-Advanced (LTE-A) system), and their evolutions, whether already existing or developed in the future. For clarity, the following description focuses on wireless networks providing wireless transmissions for data communications of wireless devices onboard train units, such as High Speed Trains (HST) communication systems for providing wireless communications to mobile terminals onboard HST. However, technical features of the present invention are not limited thereto.

As used herein, the terms "wireless device" may be used to indicate any device, fixed or mobile, capable of wireless communication with a network node of a wireless infrastructure network, and, depending on the wireless network, may be referred to as a mobile station (MS), a mobile terminal (MT), a mobile equipment, a user terminal, a subscriber station, a user equipment (UE), an onboard unit (OBU), etc. A wireless device may support voice and data communication, only voice communication, or only data communication, such as a Machine-to-Machine (M2M) device.

As used herein, the terms "access point" and "access node" may indifferently be used to indicate a fixed network node of a wireless infrastructure network, capable of wireless communication with a wireless device, and, depending on the wireless network, may be referred to as a base station (BS), a base transceiver station (BTS), a Node-B, an evolved Node-B (eNB), a Wayside Radio Unit (WRU), etc.

Figure 2:
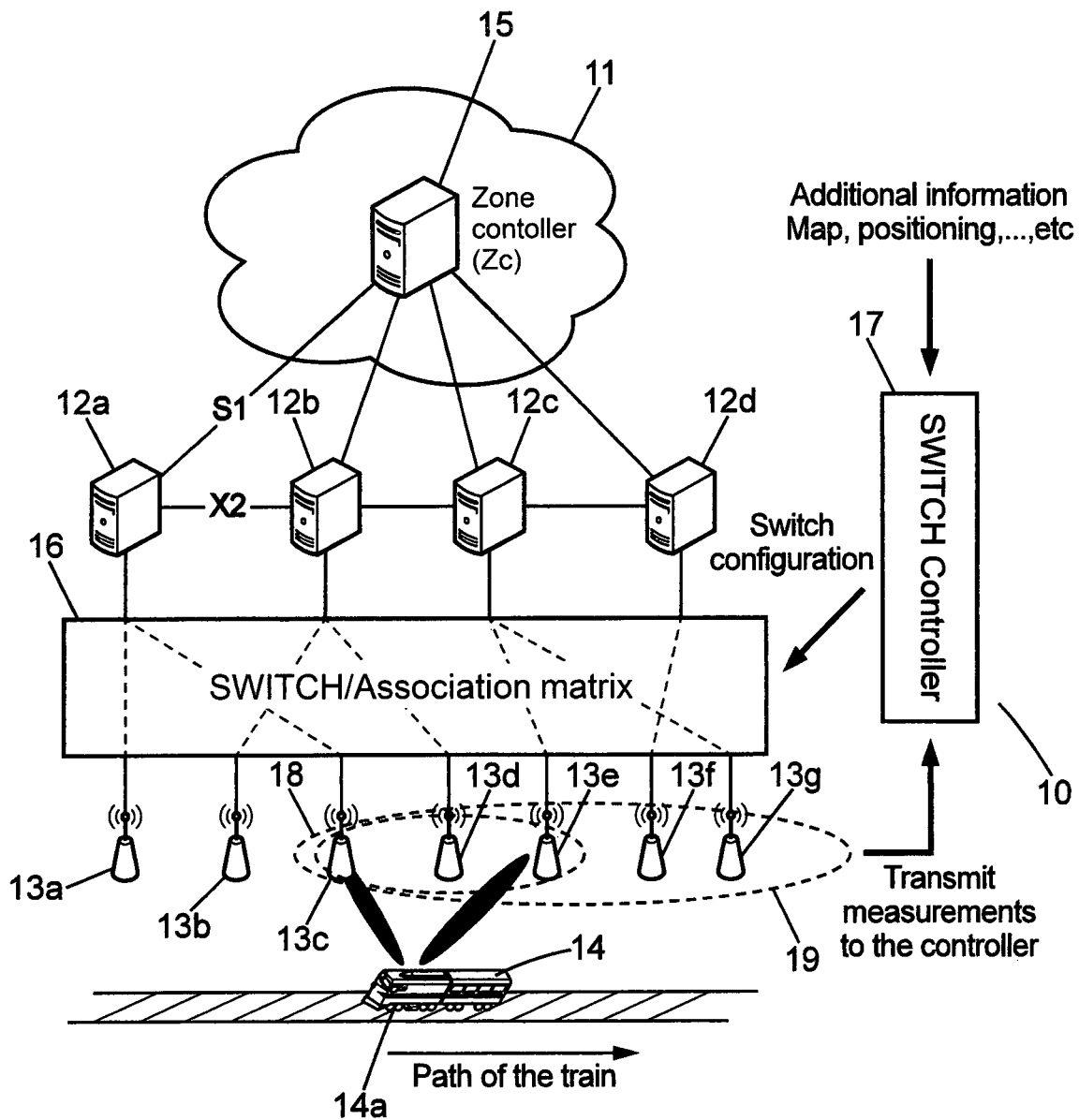
FIG. 2 is a schematic diagram illustrating an overall architecture of an HST communication system according to one or more embodiments.

FIG. 2 illustrates an overall architecture of an HST communication system according to one or more embodiments of the present subject disclosure.

Shown on FIG. 2 is an exemplary wireless communication system 10 which comprises an LTE network and one or more LTE mobile terminals (MT) (14). The network may comprise a Core Network 11 (also referred to herein as a "backhaul" network) connected to an Access Network (also referred to herein as a "fronthaul" network). The fronthaul network comprises central units (CUs) 12a-12d, and distributed units (DUs) 13a-13g. A base station of the fronthaul network may comprise one or more distributed units 13a-13g and a central unit 12a-12d. The DUs manage wireless transmission in respective geographical coverage areas, called cells, which may be partially overlapping to provide seamless handover between two neighboring cells.

The core network 11 may comprise a zone controller (ZC) 15, and each base station of the fronthaul network may be connected to the backhaul network through a logical interface with the zone controller 15 referred to as a S1 interface. Two central units of the fronthaul network may be interconnected through a logical interface referred to as a X2 interface. A CU and a DU may be interconnected via a fronthaul interface according to the CPRI and/or the OBSAI specifications, which may be implemented, and may be configured to communicate using the Ethernet protocol (e.g. 10 Gigabit Ethernet, 100 Gigabit Ethernet, or the like), in which case the CPRI interface may be referred to as an "e-CPRI" interface. Each DU may manage a cell of the network, and in some architecture designs, one DU may be connected to only one CU, so as to avoid cell resource access conflicts between multiple CUs managing a same DU. In other architectures, a DU may be connected to multiple CUs, so as to increase the network resiliency, in particular against CU failures or fronthaul interface failures.

The MT 14 may be mobile, and located onboard a High Speed Train 14a. The MT may be equipped with at least two transmission and/or reception antennas, and may be in wireless communication with a plurality of DUs 13c, 13e of the fronthaul network through a logical interface referred to as a Uu interface.

The protocols over the Uu and S1 interfaces may be divided into user plane protocols on the one hand, which are protocols implementing the actual PDU session service, that is, carrying user data through the access stratum (AS), and control plane protocols on the other hand, which are protocols for controlling various aspects of the PDU sessions and the connection between a UE and the network, including requesting the service, controlling different transmission resources, handover, etc.

Different radio interface protocol stacks are specified for use in the access stratum on the Uu interface for the control plane and the user plane. The radio interface is typically composed of 3 layers with corresponding protocols. For 4G (LTE) networks, the 3GPP TS 36.200 series describes the Layer 1 (Physical Layer), while layers 2 and 3 are described in the 3GPP TS 36.300 series specifications. Reference to these specifications may be made for further details on these 3 layers or their associated protocols.

Layer 1, the physical layer (PHY), provides data transport services to higher layers, and interfaces the Medium Access Control (MAC) sub-layer of Layer 2 and the Radio Resource Control (RRC) Layer of Layer 3. The physical layer offers a transport channel to MAC, and access to the services offered by the PHY layer is through the use of a transport channel via the MAC sub-layer. The transport channel is characterized by how the information is transferred over the radio interface. Physical layer procedures include cell search, power control, uplink synchronisation and uplink timing control, random access related procedures, Hybrid Automatic Repeat ReQuest (HARQ) related procedures, relay related procedures, sidelink related procedures, and channel Access procedures.

The layer 2 of LTE networks is split into the following sublayers: Medium Access Control (MAC), Radio Link Control (RLC), and Packet Data Convergence Protocol (PDCP). MAC offers different logical channels to the Radio Link Control (RLC) sub-layer of Layer 2. The main services and functions of the MAC sublayer include mapping between logical channels and transport channels, multiplexing/demultiplexing of MAC SDUs belonging to one or different logical channels into/from transport blocks (TB) delivered to/from the physical layer on transport channels, scheduling information reporting, error correction through HARQ, priority handling between logical channels of one UE, priority handling between UEs by means of dynamic scheduling, MBMS service identification, transport format selection, and padding.

In layer 3, the main services and functions of the RRC sublayer, which is defined in the control plane, include broadcast of System Information related to the non-access stratum (NAS), broadcast of System Information related to the access stratum (AS), paging, establishment, maintenance and release of an RRC connection between the UE and E-UTRAN including allocation of temporary identifiers between UE and E-UTRAN and configuration of signalling radio bearer(s) for RRC connection, low priority SRB and high priority SRB, security functions including key management, establishment, configuration, maintenance and release of point to point Radio Bearers, mobility functions including: UE measurement reporting and control of the reporting for inter-cell and inter-RAT mobility, handover, UE cell selection and reselection and control of cell selection and reselection, and context transfer at handover, notification and counting for MBMS services, establishment, configuration, maintenance and release of Radio Bearers for MBMS services, Quality of Service (QoS) management functions, UE measurement reporting and control of the reporting, NAS direct message transfer to/from NAS from/to UE.

A non-access stratum (NAS) layer located above the RRC layer provides services and functions such as session management.

In some deployment scenarios of the fronthaul network of FIG. 2, the DUs may be deployed along a railroad on which the HST 14a rides. The DUs may be configured to transmit/receive packets to/from the central units, which may be configured to perform various L2/L3 packet processing tasks, including scheduling, routing, etc. The CU node of each base station may provide both control plane functions and user plane functions to a plurality of DUs that operate under its control in the base station.

Depending on the considered scenario, the different logical entities (distributed unit, control plane CU and user plane CU) may be physically implemented and deployed in different ways.

Also shown on FIG. 2 is a so-called "switch/association matrix" 16, which represents a set of connections among the central units (CUs) 12a-12d and the distributed units (DUs) 13a-13g of the fronthaul network, which can be dynamically configured through activation/deactivation of a set of logical fronthaul connections that respectively correspond to a set of communication links among the CUs 12a-12d and the DUs 13a-13g. The switch/association matrix may be indifferently referred to in the following as a "switch matrix", and as an "association matrix". The wireless communication system 10 may also include a controller 17 configured for controlling the configuration of the switch/association matrix 16. In one or more embodiments, the switch/association matrix 16 may comprise a routing matrix unit configured for defining paths from each CU to each DU in the fronthaul network. In some embodiments, each path may comprise a tunnel that is defined by a source CU, i and a target DU j and configured for routing user plane packets for the mobile terminal MT 14 from the source CU 12a, 12c to the target DU 13c, 13e. In some embodiments, a path in the switch/association matrix 16 may be implemented for the downlink (respectively uplink) direction by means of tunneling data packets from a source CU 12a, 12c to a target DU 13c, 13e (respectively from a source DU to a target CU) using any suitable tunneling protocol for Ethernet packetization of CPRI signals. In other embodiments, a path in the switch/association matrix 16 may be defined for the downlink (respectively uplink) direction by address information for a source CU and a target DU (respectively a source DU and a target CU), for example by address information comprising aa source layer 2 address and target layer 2 address (e.g. a couple of addresses comprising a source layer 2 sub-layer MAC (medium access control) address and a target MAC address)), which address information may be provided in the Ethernet packet. The switch/association matrix 16 may in this latter exemplary case comprise a routing matrix that is using MAC addresses of a source CU and target DU (and/or MAC addresses of a source DU and target CU).

It will be appreciated by those having ordinary skill in the relevant art that any suitable network topology for the fronthaul network or the backhaul network, such as, for example, a ring topology or a mesh topology, may be used in place of the network topologies illustrated on FIG. 2 which are given by way of example only. Likewise, any suitable network functional architecture may be used in place of the architecture of system 10 which is given by way of example only. Further, any embodiment described herein for the downlink direction (i.e., for data communication from a fronthaul network to a mobile terminal) may be transposed to the uplink direction (i.e., for data communication from a mobile terminal to a fronthaul network), so that any path of the switch/association matrix 16 may be configured for the downlink direction, for the uplink direction, or for both the downlink and uplink directions.

Figure 3:
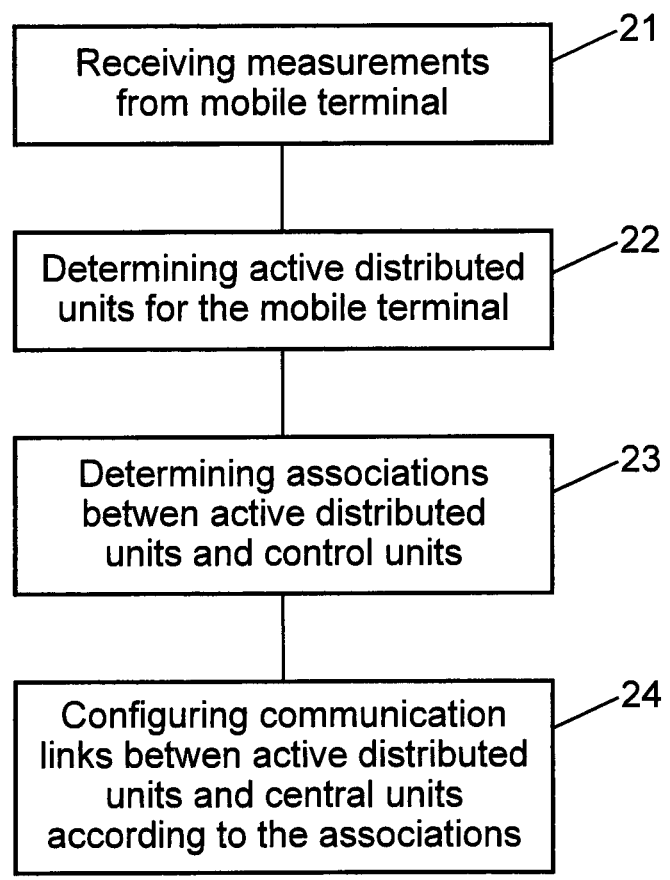
FIG. 3 is a flow chart illustrating an exemplary network management process, in accordance with one or more embodiments.

FIG. 3 illustrates a proposed method according to one or more embodiments.

According to the present subject disclosure, a fronthaul network of a wireless communication system may be managed through dynamic configuration/reconfiguration by a controller of the wireless communication system. The fronthaul network may comprise several distributed units and one or more central units, wherein each distributed unit of the several distributed units may be configured to provide, under the control of a central unit of the one or more central units, wireless communication of data between a mobile terminal and the fronthaul network.

A fronthaul network dynamic configuration may be performed on the fronthaul network, which may comprise the receiving 21 measurements from the mobile terminal.

In some embodiments, the measurements received from the mobile terminal may comprise measurements related to a position or location of the mobile terminal, measurements related to a speed of the mobile terminal, and/or measurements related to a direction of movement of the mobile terminal.

Information regarding a geo-location of the mobile terminal may be obtained through different methods, the results of which may be used alone or in combination to increase their accuracy. For example, the mobile terminal may be equipped with a geo-positioning sensor (e.g., a Global Positioning System sensor, a Galileo sensor, or the like), and configured to transmit to the wireless communication system information indicating its geo-location. As another example, the wireless communication system may be configured to determine a position of the mobile terminal based on information received from the mobile terminal, for example based on the base stations of the fronthaul network with which the mobile terminal is in wireless communication, the geo-location of such base stations (e.g., of distributed units or remote radio heads thereof) being known.

Likewise, Information regarding a geo-location of the mobile terminal may be obtained through different methods, the results of which may be used alone or in combination to increase their accuracy. For example, the mobile terminal may be equipped with a geo-positioning sensor (e.g., a Global Positioning System sensor, a Galileo sensor, or the like), and configured to transmit to the wireless communication system information indicating its speed. As another example, the wireless communication system may be configured to determine a speed of the mobile terminal based on information received from the mobile terminal, for example based on geo-location of the mobile terminal obtained at the wireless communication system.

A direction of movement of the mobile terminal may also, depending on the embodiment, be determined and transmitted by the mobile terminal, or be determined by the system based on information regarding the mobile terminal obtained by the system, such as, for example, geo-positioning information. In some embodiments, a trajectory of the mobile terminal may be predefined, and stored in a database of the wireless communication system, for example as a set of geo-locations respectively associated with directions of movement. Such may typically be the case, for example for HST communication systems, where the system may be provided with a database where trains are identified in correspondence with trajectories, or for example for IoT networks where machines (robots) are configured to be mobile according to predefined trajectories.

A set of one or more active distributed units among the plurality of distributed units may then be obtained 22, based on the received measurements, for the mobile terminal. That is, the one or more active distributed units may be usable by the mobile terminal for radio communication with the fronthaul network.

In some embodiments, a distributed unit may be considered active upon the setting up or the configuration of one or more active associations with one or more CUs, that is, the DU may be configured for transmitting and/or receiving data packets to and/or from these one or more CUs in the fronthaul network. In contrast, measurement DUs may be DUs with active radio but which are not associated to CUs of the fronthaul network.

In embodiments where the received measurements comprise a location and a speed of the mobile terminal, and in which a trajectory of the mobile terminal is known to the system, future locations of the mobile terminal on such trajectory may be determined, and active distributed units may be identified based on the determined future locations of the mobile terminal. That is, distributed units may be selected among the distributed units of the fronthaul network to anticipate their use for wireless data communication between the mobile terminal and the fronthaul network.

In some embodiments, the set of active distributed units determined for the fronthaul network configuration may be determined repeatedly as the mobile terminal moves along its trajectory (for example as the HST moves along its tracks). Determined sets of active distributed units may then be stored, in association with corresponding positions on the mobile terminal trajectory, for example in a database configured for storing data representing such information.

A set of active distributed units may then be, depending on the embodiment, retrieved from the database based on a position of the mobile terminal on its trajectory, determined based on the position of the mobile terminal on its trajectory, or both, for purposes of comparing the set stored in the database with the determined set and possibly updating the set of active distributed units data stored in the database based on the comparison results.

Once a set of active distributed units has been identified for the mobile terminal depending on its position, central units for controlling the identified active distributed units may then be determined. Said otherwise, associations between each of the active distributed units in the set of obtained distributed units and one or more respective central units of the one or more central units may be determined 23.

Depending on the embodiment, specific rules for associations between distributed units and central units may be specified, so that the associations may be determined according to such rules. For example, the fronthaul network deployment (because of the network dimensioning, equipment limitations, network topology, etc.) might not allow having two central units managing the same distributed unit.

In some embodiments, the fronthaul network topology may allow selecting one or several of a plurality of central units to manage a distributed unit, so that one or several associations may be determined between the one or several central units that can be selected, and an active distributed unit of the obtained set of active distributed units for the mobile terminal. An association may also be determined between a single central unit and a plurality of active distributed units.

The communication links between each of the active distributed units and their respective one or more central units may then be configured 24 according to the determined associations. In some embodiments, this may entail activating respective communication links between the DUs and the CUs according to the determined associations, so that the fronthaul network may be reconfigured according to the determined associations. The activating a communication link between a DU and a CU may, depending on the interfaces used on such communication link, include activating such interfaces, setting up connections, setting up data paths according to the communication protocols used by the interfaces, etc.

The configuration of the communication links between each of the active distributed units and their respective one or more central units may also entail, in some embodiments, the deactivating of some communication link as part of the reconfiguring of the fronthaul network.

In one or more embodiments, the fronthaul network dynamic configuration may further comprise the transmitting to the mobile terminal fronthaul network configuration information that comprises information indicating the set of one or more active distributed units.

For example, as the mobile terminal moves along its trajectory, it may be informed by the system on active distributed units that are usable, and which have been selected by the system, for its wireless communication with the fronthaul network.

In other embodiments, the dynamic fronthaul network configuration or reconfiguration may be completely transparent to the mobile terminal, which may perform handovers between active distributed units as it moves along its trajectory in a transparent manner, that is, with no change as compared to its handover operations with respect to any fronthaul network. In such embodiment, the dynamic reconfiguration of the fronthaul network may include the determining or obtaining (e.g., from a database storing relevant data) an updated set of active DUs based on the position of the mobile terminal, the determining or obtaining (e.g., from a database storing relevant data) of CUs to control the active DUs, and the configuration of the communication links between the selected CUs and active DUs.

In one or more embodiments, the fronthaul network dynamic configuration may further comprise the obtaining, based on the information indicating a positioning of the mobile terminal, on information indicating a speed of the mobile terminal, and information indicating a direction of movement of the mobile terminal, a set of one or more measurement distributed units among the plurality of distributed units, to be used by the mobile terminal for radio measurements on wireless links between the mobile terminal and the measurement distributed units.

In some embodiments, the mobile terminal may have a predetermined trajectory, so that information related to its direction of movement may be known (e.g., stored in a database storing its trajectory) for positions along its trajectory. In such case, the system may be configured to determine DUs with respect to which the mobile terminal may be able to perform measurements, based on the information indicating a positioning of the mobile terminal and information indicating a speed of the mobile terminal.

For example, if the mobile terminal is located at a first position P1 at time T1, the information related to its speed may be used to predict the mobile terminal's position P2 at time T2, where T2>T1.

In some embodiments, the mobile terminal may have a predetermined path along its trajectory, as for instance would be the case for trains having a predetermined path along their respective railway tracks, in particular HSTs. In such case, information related to the speed of the mobile terminal may also be predetermined, and stored in a database in association with respective positions of the mobile terminal along its trajectory, and may be obtained by being retrieved from the database when needed for the determination of the set of measurement DUs.

In other embodiments, the information related to the speed of the mobile terminal may be received from the terminal.

As described above with respect to the set of active DUs and the associations between DUs and CUs, typically in embodiments where the mobile terminal repeatedly travels along a same trajectory, the set of measurement DUs may have been previously determined, and stored in association with respective locations of the mobile terminal in a database configured for storing data representing sets of measurement DUs associated with respective locations of the mobile terminal. In such embodiments, the set of measurement DUs that correspond to the current location of the mobile terminal may be obtained by being retrieved from the database.

In some embodiments, the set of measurement DUs may have been previously determined, and stored in association with respective locations of the mobile terminal and respective speeds of the mobile terminal in a database configured for storing data representing sets of measurement DUs associated with respective locations of the mobile terminal and respective speeds of the mobile terminal. In such embodiments, the set of measurement DUs that correspond to the current location of the mobile terminal and to the current speed of the mobile terminal may be obtained by being retrieved from the database. As described above, the location and speed of the terminal may each be measured by the terminal and received therefrom, or determined by the system based on wireless communications with the terminal.

In one or more embodiments, once the set of one or more measurement distributed units is determined, the system may be configured to transmit to the mobile terminal information indicating the set of one or more measurement distributed units, for example comprised in the fronthaul network configuration information. The mobile terminal may be configured to, further to receiving such information indicating the set of one or more measurement distributed units, perform measurements on radio signals received from the measurement distributed units. In some embodiments, the mobile terminal may further be configured to transmit to the controller measurement data resulting from the measurements performed with the measurement distributed units.

The set of measurement distributed units may preferably include the set of active distributed units, as the mobile terminal may also be configured to perform measurements on radio signals exchanged with the active distributed units.

In one or more embodiments, the associations may be determined with an objective to increase a data communication throughput between the mobile terminal and the fronthaul network.

Alternatively or in addition, the associations may be determined with an objective to increase a resiliency of the fronthaul network for data communications between the mobile terminal and the fronthaul network.

Various embodiments of the present subject disclosure will now be described, with reference to the exemplary system shown on FIG. 2.

In some embodiments, the HST mobile terminal 14 may be configured to measure radio signals from a set of DUs, i.e. a measurement set 19, that is larger than the active DUs set 18. The measurements and additional network information, such as the current position, current speed of the train, and/or radio parameters map of the propagation may be transmitted by the mobile terminal 14 to the switch controller 17, which may be configured to use such information to configure the CU/DU association matrix 16.

Depending on the embodiment, several criteria may be used for the dynamic (re)configuration of the association matrix 16 of the fronthaul, as follows:

In some embodiments, the switch/association matrix 16 may be dynamically configured so as to provide seamless connectivity between the CUs and the DUs according to the mobility of the mobile terminal 14. The associations may be activated between the active DUs set 18 and a specific set of CUs as long as the mobile terminal is associated to the active DUs set 18, and deactivated upon the mobile terminal moving away from the active DUs set 18. In such embodiments, the active DU set can be seen as a set of DUs that is sliding along the set of DUs deployed for the fronthaul network as the mobile terminal 14 moves along its trajectory (as the train 14a moves along its railway tracks).

In some embodiments, the switch/association matrix 16 may be configured/reconfigured according to a fronthaul network reconfiguration update function that determines whether reconfiguration is to be performed based on reconfiguration parameters that include the speed of the mobile terminal 14 along its trajectory. For example, in some embodiments, the fronthaul configuration latency may be reduced when the speed of the HST is increased, and/or the fronthaul configuration latency may be increased for low speeds of the HST. The fronthaul configuration latency may be determined in some embodiments based on a lookup table in which predetermined configuration latencies may be respectively associated with HST speeds.

In some embodiments, the switch/association matrix 16 may be dynamically configured so as to provide connections between the CUs and the DUs that maximize the sum throughput offered to the active DU set. This optimization may in some embodiments take into account the throughput limit on the different fronthaul associations, which may occur for example when congestion is detected in the fronthaul or when the association matrix is formed of different heterogeneous wired connections.

In some embodiments, the switch/association matrix 16 may be dynamically configured so as to increase and/or adapt the fronthaul redundancy in order to protect the associations between the CUs and DUs from congestions that are detected or may occur during the mobility of the mobile terminal 14.

In one or more embodiments, the switch controller 17 may be configured to set radio parameters of the active DUs in order to configure the active DUs area into a single frequency network (SFN), so as to improve the throughput of data received from multiple active DUs 13c, 13e at the mobile terminal 14. The switch controller 17 may further be configured to also configure connections between the CUs and the DUs contributing to the SFN area, and setup multipoint transmissions between the DUs and the mobile terminal 14. In one or more embodiments, the switch controller 17 may be configured to determine based on the measurements of the HST, a set of active DUs, and modify the radio parameters of the set of active DUs in order to setup a single frequency network configuration. The switch controller 17 may be configured to setup the associations between the CUs and the active DUs as well as between the CUs in order to coordinate the transmissions between the CUs and the active DUs of the single frequency network. The mobile terminal 14 may receive from the network signaling data comprising information regarding combinations of data packets received from the different active DUs of the SFN network in order to start coordinated multipoint transmission. The coordinated multipoint transmission allows the mobile terminal to receive coordinated and non-interfering transmissions from multiple DUs in order to increase the throughput received at the high speed train.

In one or more embodiments, the switch controller 17 may be configured to determine the active DU set 18, the measurement DU set 19, and the CU set, based on received measurements performed by the mobile terminal 14. In some embodiments, the measurement DU set 19 may be used to select the DUs that will be used for the future reconfiguration of the switch/association matrix 16. In some embodiments, the CU set may advantageously be determined for load balancing among the CUs, for example as the set of CUs that includes the less loaded CUs among the CUs that may contribute to the future fronthaul reconfiguration.

In some embodiments, the active DU set 18, the measurement DU set 19, and/or the CU set may be determined based on the position of the mobile terminal 14.

In some embodiments, the active DU set 18, the measurement DU set 19, and/or the CU set may further be determined based on the speed of the mobile terminal 14. In embodiments, the size of the measurement DU 19 may be increased in order to anticipate a dynamic fronthaul configuration if the speed of the mobile terminal 14 is higher than a predetermined threshold, which may for example be around 150 km/h. In some embodiments, the active DU set 18 may be determined as the set of DUs that includes DUs to which a mobile terminal 14 is connected along the railroad side.

In some embodiments, the active DU set 18, the measurement DU set 19, and/or the CU set may be determined based on the traffic on the railroad. For example, if there are N mobile terminal respectively corresponding to N trains currently active in the railroad, the active DU set 18 and measurement DU set 19 and/or the CU set may be determined jointly for the N different mobile terminals.

In some embodiments, the active DU set 18, the measurement DU set 19, and/or the CU set may be determined based on a measured railroad interference profile, i.e. the power of the interference measured at the mobile terminal, and/or the interference between the active DUs that are associated with different mobile terminals. The active DUs may thus be determined as the DUs that are the most interfering over the mobile terminals of the deployment. In case of HST, the active DUs may be the DUs that are interfering over a high number of HST in the scenario.

In one or more embodiments, the switch controller 17 may be configured to dynamically configure/reconfigure the switch/association matrix 16 in order to provide connectivity and improve the throughput offered to the active DUs, based on the position of the mobile terminal 14.

In some embodiments, the configuring of the switch/association matrix 16 may include setting logical fronthaul connections among the less loaded CUs and the DUs that are obtained from the determination of the set of measurement DUs (that is, the measurement DUs), and that are best received by the mobile terminal 14 (for example that are received by the mobile terminal 14 with a signal to noise (SNR) ratio above a predetermined threshold, which may be dynamically updated or fixed, depending on the embodiment). This advantageously allows anticipating the handover of the mobile terminal 14 by preparing the connections between the CUs and the DUs of the set of measurement DUs, thereby improving the handover latency of the switch/association matrix 16 reconfiguration, and optimizing the throughput offered to the mobile terminal 14.

In some embodiments, the configuring of the switch/association matrix 16 may include setting logical fronthaul connections among any of the available CUs and the DUs of the set of measurement DUs, and that are best received by the mobile terminal 14 (for example that are received by the mobile terminal 14 with a SNR above a predetermined threshold, which may be dynamically updated or fixed, depending on the embodiment). This advantageously allows anticipating the handover of the mobile terminal 14 by preparing the connections between the CUs and the DUs of the set of measurement DUs, thereby improving the handover latency of the switch/association matrix 16 reconfiguration.

In some embodiments, the configuring of the switch/association matrix 16 may include determining the fronthaul connection capacities between the available CUs and the DUs of the set of measurement DUs, and that are best received by the mobile terminal 14 (for example that are received by the mobile terminal 14 with a SNR above a predetermined threshold, which may be dynamically updated or fixed, depending on the embodiment). The switch controller 17 may be configured to determine, based on the capacities, a subset of associations between the CU and the DUs that maximizes the sum of the throughput that is offered to the DUs from the measurement set, i.e. the subset of associations that solves a CU/DU assignment problem, that is, a problem of configuring the CU/DU associations such that the fronthaul network throughput of data communications with mobile terminals is maximized. The obtained subset of associations may determine both the CUs and the active DUs.

In one or more embodiments, the switch/association matrix 16 redundancy may be configured/reconfigured in order to protect the fronthaul network against CU, DU and/or communication links between CUs and DUs failures.

In some embodiments, the switch/association matrix 16 redundancy may be updated based on a CU degree criterion defined for a CU of the switch/association matrix 16 as the number of DUs in the switch/association matrix 16 connected to the CU. The configuring of the switch/association matrix 16 may in such embodiments include increasing a CU degree if failures of DUs connected to the CU are expected/anticipated in the switch/association matrix 16. For example, in case of failure of a DU connected to the CU, a data packet of the CU intended for the failing DU may be retransmitted with lower latency and/or broadcasted to the active DUs determined for the mobile terminal 14.

In some embodiments, the switch/association matrix 16 redundancy may be updated based on a DU degree criterion defined for a DU of the switch/association matrix 16 as the number of CUs connected to the DU. The configuring of the switch/association matrix 16 may in such embodiments include increasing a DU degree if failures of a CU connected to the DU are expected/anticipated in the switch/association matrix 16. For example, in case of failure of a CU that is connected to multiple DUs, an uplink packet of the DU may be retransmitted to another CU in the CU pool of the DU, where the CU pool of the DU is the set of CUs that the DU is connected to, further to the reconfiguration of the switch/association matrix 16.

In some embodiments, the switch/association matrix 16 redundancy may be updated based on an average number of paths from any CU in a determined set of CUs to any DU in a set of DUs that are connected to the CUs of the set of CUs with latency lower than a predetermined threshold. These paths are considering the CU-DU associations as well as the connections between different CUs in the CU set. The configuring of the switch/association matrix 16 may in such embodiments include increasing this average number of paths by establishing additional CU/DU associations and/or CU/CU connections with controllable latency if a number of association failures between the CUs and DUs and between the CUs are detected in the switch/association matrix.

Figure 4:
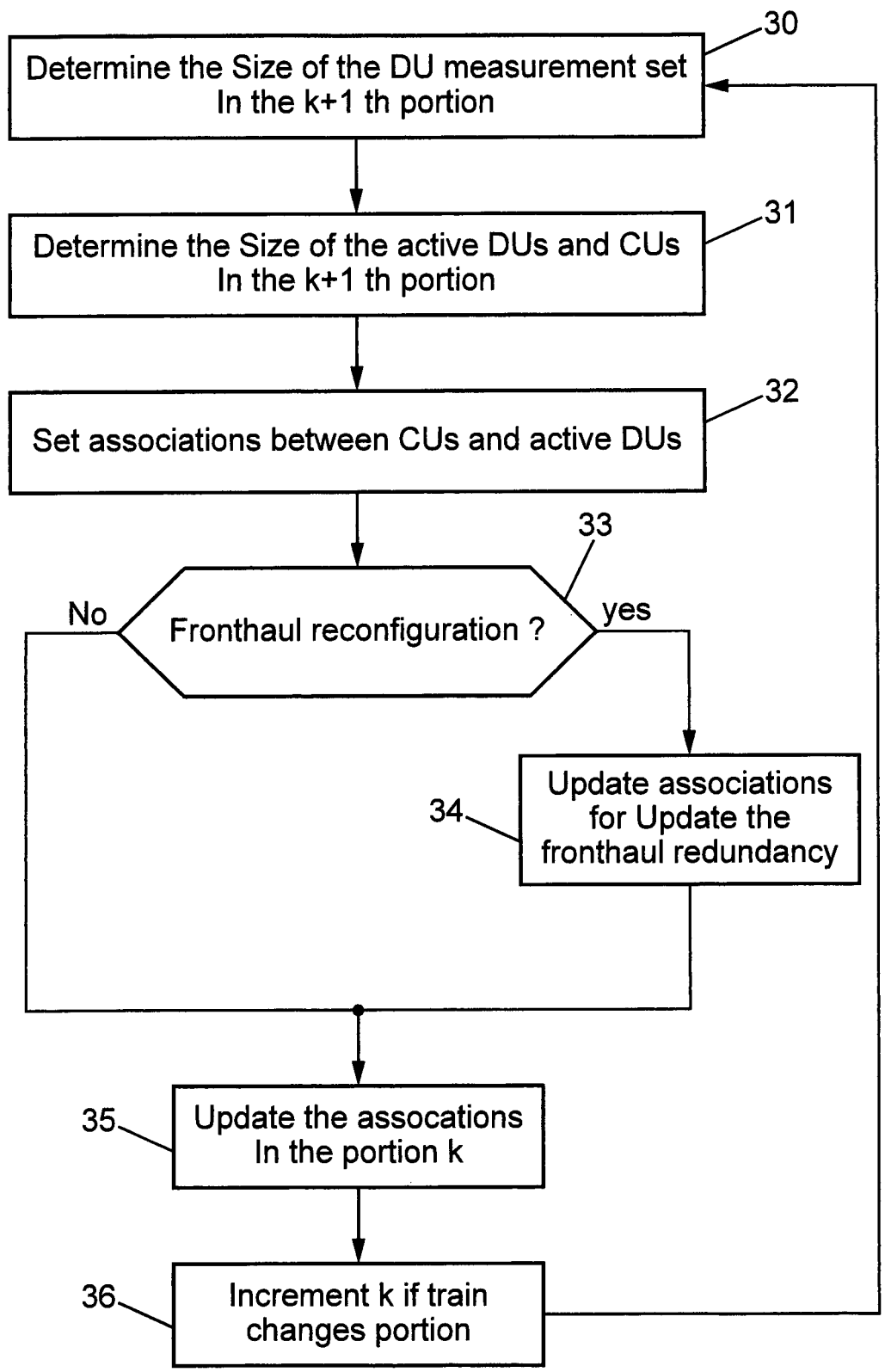
FIG. 4 is a flow chart illustrating an exemplary method for configuring a switch/association matrix according to one or more embodiments.
Figure 5:
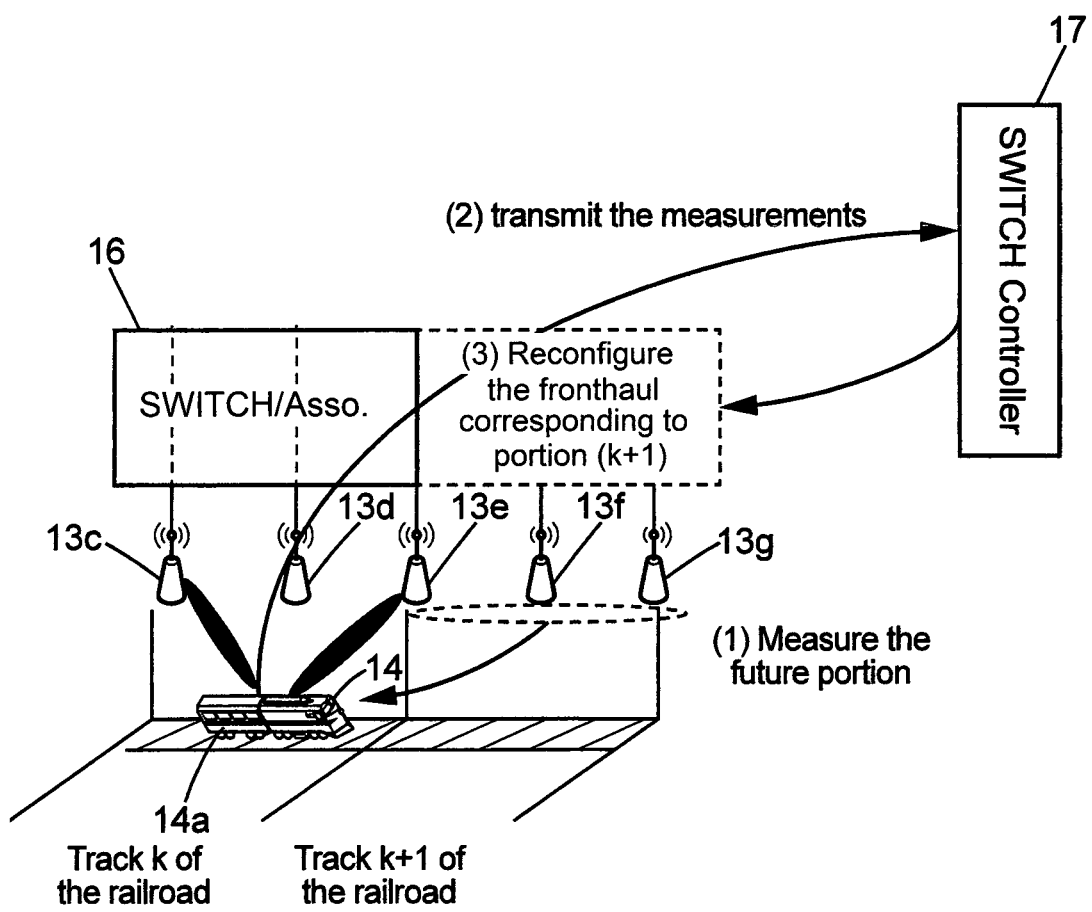
FIG. 5 is a schematic diagram illustrating an exemplary method for configuring a switch/association matrix according to one or more embodiments.

FIG. 4 is a flow diagram that illustrates a method for configuring a switch/association matrix according to one or more embodiments. FIG. 5 illustrates the method for configuring a switch/association matrix according to one or more embodiments.

Referring to FIGS. 2 and 5, a model of the railroad on which the train 14a rides may include K portions $\{Portion\_i\}_{i=1,\ldots,K}$, with each portion Portion_i including N distributed units $\{DU(i,j)\}_{j=1,\ldots,N}$ deployed along the railroad portion. In some embodiments, the fronthaul network dynamic configuration may be performed at iterations of a fronthaul network dynamic configuration loop, an iteration of the loop being executed for each portion of the railroad model. The switch controller 17 may be configured to, upon detecting that the train 14a enters the $k^{th}$ portion Portion_k, execute a $k^{th}$ iteration of the fronthaul network dynamic configuration loop. The $k^{th}$ iteration of the loop may include the determination 30 of a measurement DU set 19, the determination 31 of the active DU set 18 and of CUs for the portion Portion_k+1 and in some embodiments the determination of additional DUs that will be added in order to absorb additional delay of the fronthaul reconfiguration (not shown on the figure), possibly based upon measurement information received by the controller 17 from the mobile terminal 14. Indeed, in some embodiments, the mobile terminal may perform measurements related to the portion (Portion_k+1) following the one in which it is currently located (Portion_k), and transmit measurement information generated from these measurements to the controller 17. The measurement information received from the mobile terminal 14 may be used by the controller 17 for the determination 30 of a measurement DU set 19, the determination 31 of the active DU set 18 and of CUs for the portion on_k+1, the active DU set 18 being determined in some embodiments based on the determined measurement DU set 19 (for example as a subset of the measurement DU set 19), and/or the determination of additional DUs, as the case may be. The $k^{th}$ iteration of the loop may then potentially include the updating 32 of the associations between the CUs and the DUs in the switch/association matrix 16 in order to increase the throughput offered by the switch/association matrix 16 to the DUs in the portion Portion_k, which may or may not lead to the reconfiguration of the fronthaul network according to the updated associations. In some embodiments, a determination 34 as to whether the redundancy of the portion Portion_k may also be performed, and the fronthaul network may be reconfigured accordingly. The $k^{th}$ iteration of the loop is completed upon configuring 35 the fronthaul network corresponding to the portion Portion_k according to updated associations, as the case may be, after which the loop index k is incremented 36, so as to execute a following loop iteration upon entering in the following portion (Portion_k+1) according to the railroad model.

In one or more embodiments, the railroad may be modelled as a single portion corresponding to the entire railroad. The switch controller 17 may be configured to determine the active and measurement DU sets for the high speed trains that are present on the railroad as well as the corresponding CUs. The switch controller 17 may then be further configured to update the association between the CUs and the DUs, and/or finally the redundancy of the fronthaul network.

Figure 6:
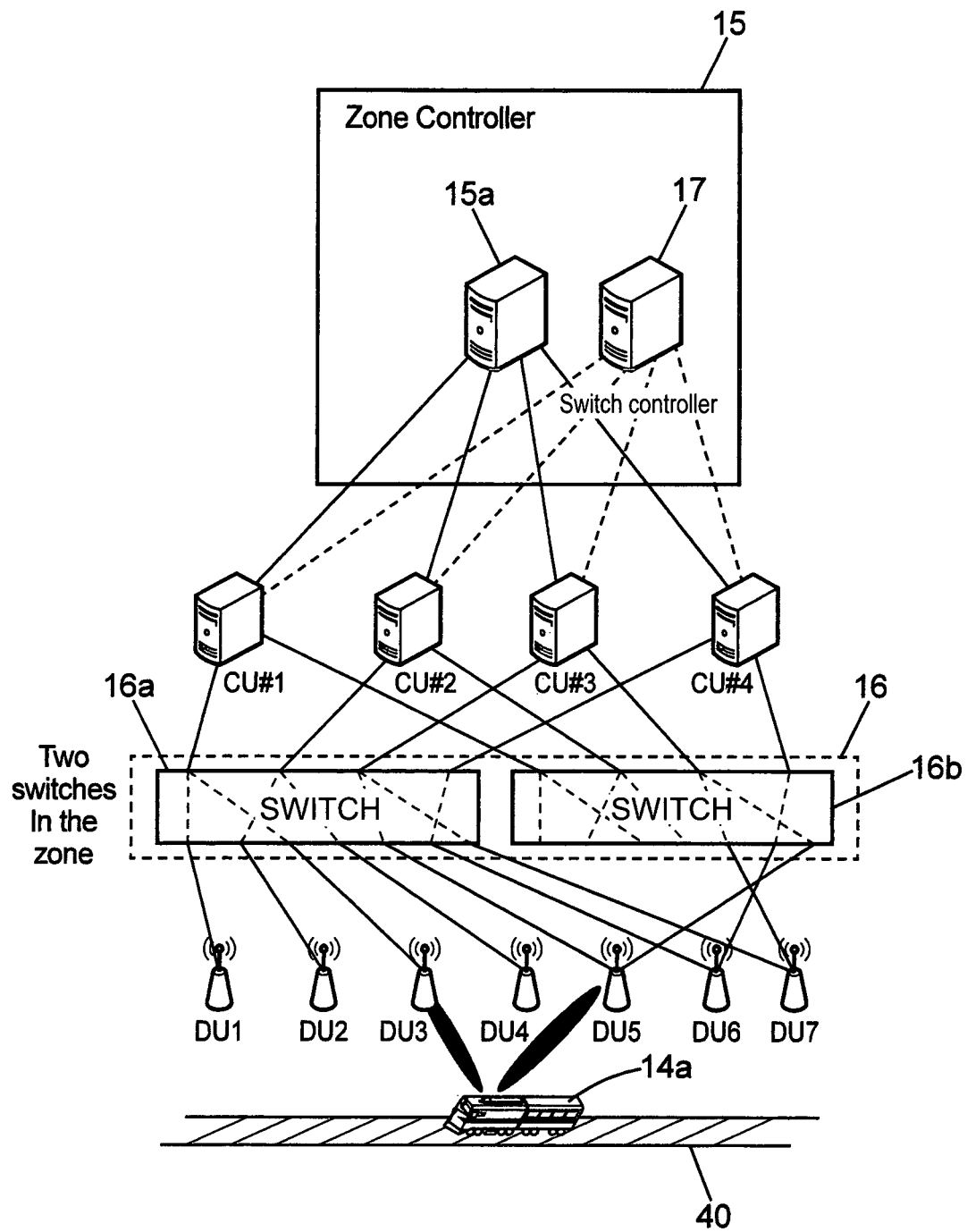
FIG. 6 is a schematic diagram illustrating an exemplary centralized switch controller feature according to one or more embodiments.

Different embodiments of the controller function disclosed herein may be considered, as follows:

FIG. 6 illustrates a centralized switch controller feature according to one or more embodiments.

In one or more embodiments, the railroad may be split into several zones, each zone being controlled by a zone controller. FIG. 6 shows one zone 40 of the railroad, which is controlled by a zone controller 15. The zone controller 15 may comprise LTE core network nodes/servers 15a, such as a node configured as a mobility management entity (MME) and/or a node configured as a serving gateway (S-GW), and may be configured to set the speed profile of the train 14a in the zone 40, and each zone may include K tracks, where each track is associated to a corresponding switch/association matrix 16a, 16b. A switch controller configured for controlling the switch/association matrices 16a-16b in the zone may be co-located with the zone controller 15 or, as illustrated in FIG. 6, a switch controller feature 17 may be implemented in the zone controller 15. A zone controller 15 implementing a switch controller feature 17 may be configured to perform the embodiments of the proposed method with respect to the switch controller feature 17 according to the present subject disclosure. In particular, a zone controller 15 implementing a switch controller feature 17 may, in some embodiments, be configured to receive measurements (e.g., related to a positioning of the mobile terminal 14, a positioning of the train 14a, a speed of the mobile terminal 14, a speed of the train 14a, etc.) from the train 14a, and/or to receive network state information from the fronthaul network (e.g., fronthaul congestion indicator(s)). The zone controller 15 implementing a switch controller feature 17 may further be configured to use the received measurements and/or the received network state information to configure one or more of the switch/association matrices 16a, 16b associated with the zone 40. The fronthaul network reconfiguration may comprise determining CU-DU associations in one or more of the switch/association matrices 16a, 16b that improve the throughput offered to sets of active DUs respectively corresponding to trains distributed on the railroad.

As described above, a fronthaul network reconfiguration may also be performed in some embodiments to modify the redundancy of the CU-DU associations in the switch/association matrices 16a, 16b in order to protect them from CU, DU and/or association failures. The switch controller 17 may be configured to configure each active DU set into a single frequency network (SFN) area. In some embodiments, the active DUs may be configured in the SFN network area setting by the switch controller to transmit data to the HST using coordinated multipoint transmission.

The embodiments that use a centralized controller may advantageously be backward compatible with LTE networks: The switch controller can indeed be located in a LTE MME node and the CU/switch controller architecture can be based on the LTE S1 Application Protocol (S1AP) specified in the 3GPP technical specification TS 36.413.

Another advantage of embodiments that use a centralized controller is the level of performance due to the switch controller receiving all the above-described network state information from the nodes of the switch/association matrix/ces of the zone, while the controller may be configured to configure/reconfigure the fronthaul network for all the switches of the railroad.

Figure 7:
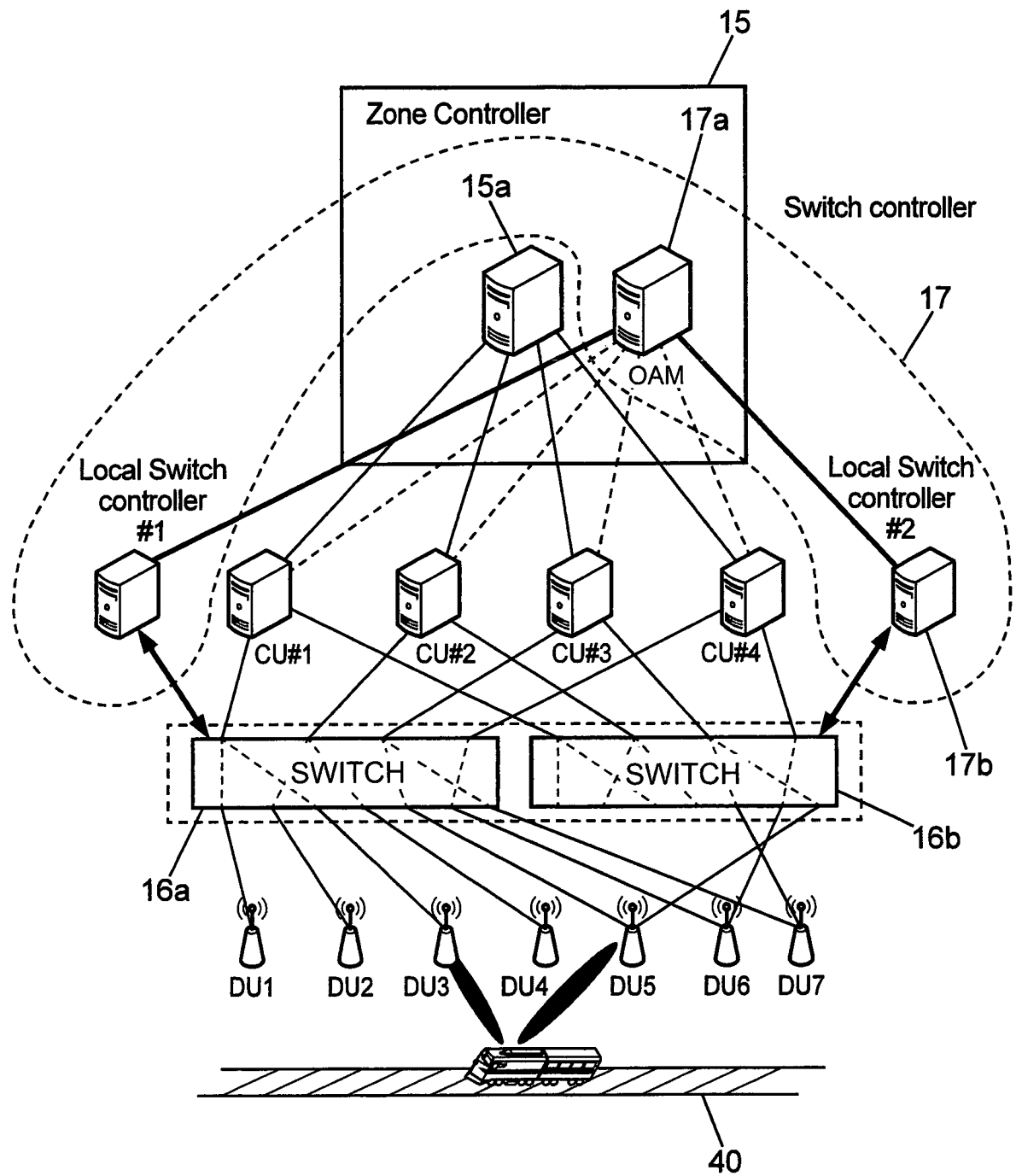
FIG. 7 is a schematic diagram illustrating an exemplary semi-centralized switch controller feature according to one or more embodiments.

As illustrated in FIG. 7, in one or more embodiments the switch controller feature 17 may be split between a part implemented in the zone controller 15 and one or more local switch controllers 17b, 17c. The zone controller part 17a of the switch controller 17 may be configured to update the redundancy of the fronthaul network in the zone 40 while the local switch controller part 17b, 17c may be configured to update the CU-DU associations in the one or more switch/association matrices 16a, 16b, such that the throughput of communication links between the fronthaul network and the train is improved.

The semi-centralized switch controller embodiments may advantageously be used for their increased flexibility and reduced complexity as compared to the centralized switch controller embodiments. In addition, Semi-centralized switch controller embodiments provide an increased resistance to failures in the zone controller node.

Figure 8:
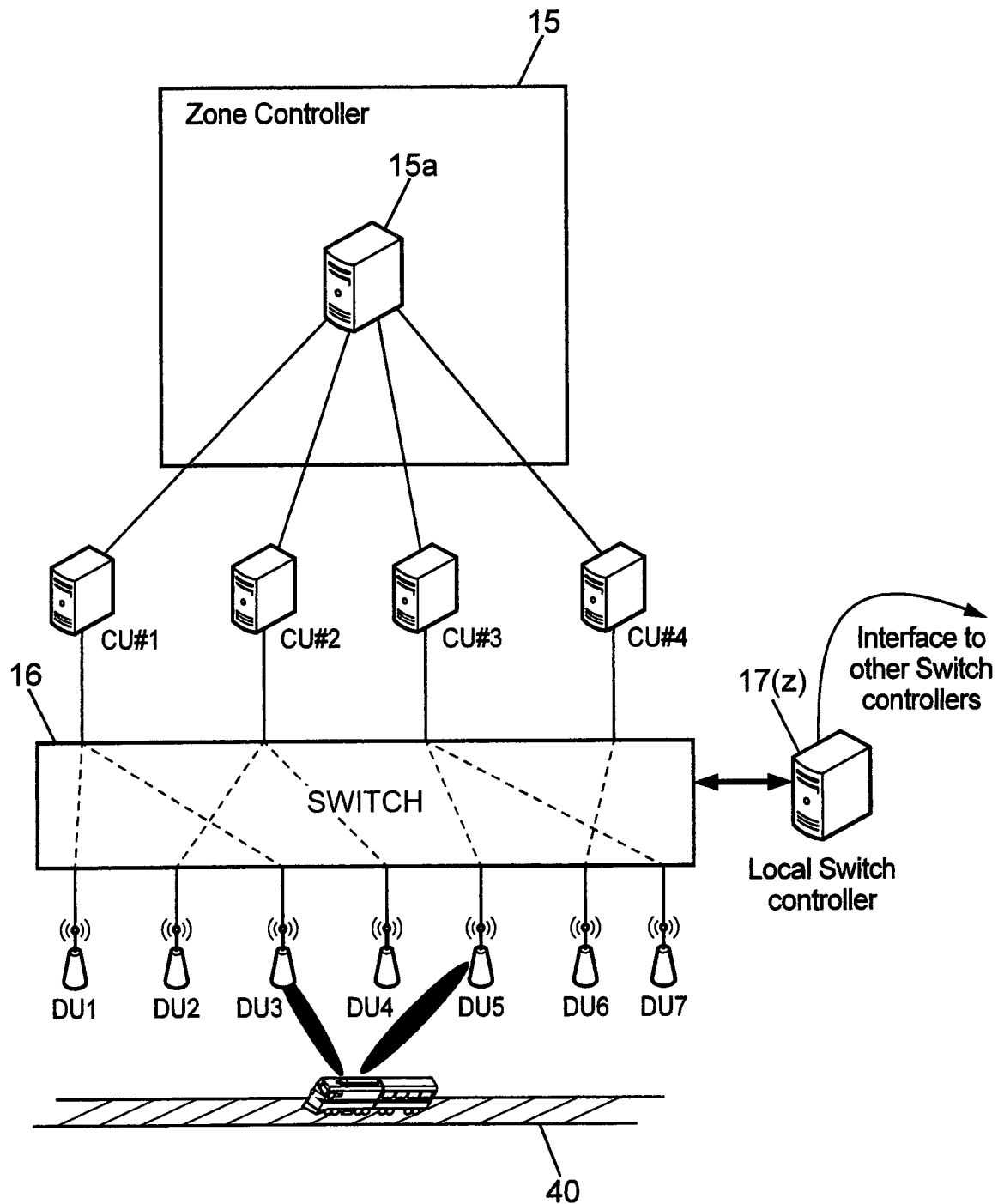
FIG. 8 is a schematic diagram illustrating an exemplary distributed switch controller feature according to one or more embodiments.

As illustrated in FIG. 8, in one or more embodiments the switch controller 17 may be split into several local switch controllers 17(z) configured to update the associations of a switch/association matrix to improve the throughput of data communications with mobile terminals onboard the train and/or improve the redundancy of the fronthaul network in a respective zone 40. The local switch controllers 17(z) may not be co-located with or implemented in the zone controller 15, and may be for example implemented in a DU of the zone or next to a local gateway (L-GW) that is closer to the DUs than the zone controller.

The distributed switch controller embodiments may advantageously be used for their increased adaptability and lower complexity when compared to other embodiments. In addition, the distributed switch controller embodiments advantageously involve less signaling overhead with respect to semi-centralized switch controller embodiments, as there is no need to coordinate between multiple distributed local controllers and a central switch controller, however possibly at the expense of an increased inter-local-switch-controllers signaling.

According to another aspect of the present subject disclosure, an apparatus configured to function as a network node in a computer network, comprising a processor and a memory operatively coupled to the processor, wherein the processor is configured for performing the above method for managing a fronthaul network, is also proposed.

Figure 9:
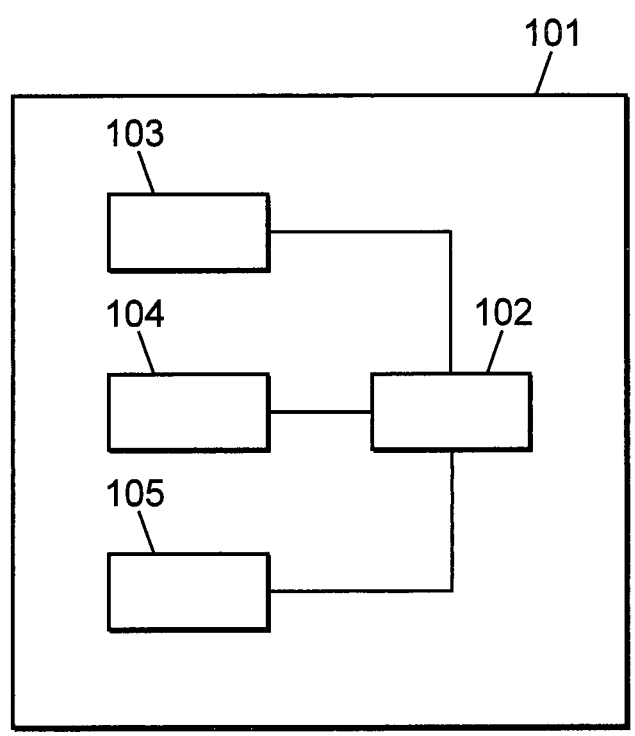
FIG. 9 is a block diagram illustrating exemplary functionality of a network node, in accordance with one or more embodiments.

FIG. 9 illustrates an exemplary network node 101 configured to implement a switch controller function in accordance with embodiments of the present subject disclosure.

The network node 101 includes a control engine 102, a network management engine 103, a data communication engine 104, and memory 105.

In the architecture illustrated on FIG. 9, all of the network management engine 103, data communication engine 104, and memory 105 are operatively coupled with one another through the control engine 102.

In one embodiment, the network management engine 103 is configured to perform various aspects of embodiments of the proposed method for network management. For example, as described above, in embodiments in which the CUs are configured to generate in the downlink Ethernet packets based on CPRI signals to be transmitted to one or more DUs, each Ethernet packet comprising a MAC address of the CU and a MAC address of a destination DU, the network management engine 103 may be configured to determine which DU is to be activated, and to control the updating of destination MAC addresses in the generated Ethernet packets accordingly. In other embodiments, the network management engine 103 may be configured to control the updating of source MAC addresses in the generated Ethernet packets, so as to activate a data communication link or path between a DU and a different CU corresponding to the updated source MAC address.

In some embodiments, the network management engine 103 may be configured to be operatively connected to a database server (not shown on the figure) which, depending on the implementation, may be co-located with the network management node (101) or an element thereof. The database server may be a NoSQL database, for example implemented using the Cassandra No SQL database technology, and may be configured to store data representing a switch/association matrix according to the present subject disclosure. In some embodiments, the database server may be configured to store data representing fronthaul configurations, possibly associated with time information and/or location information. For example, the database server may be configured to store a set of fronthaul configurations, each fronthaul configuration comprising data representing a switch/association matrix, and each fronthaul association being associated with time information and/or HST location information, so that the fronthaul network may be configured based on a location of a HST on its railway tracks, and/or based on timing information of a HST traveling on its railway tracks. In some embodiments, the database server may further be configured to store a current fronthaul network configuration comprising data representing a switch/association matrix currently used to configure the fronthaul network.

In one embodiment, the data communication engine 104 is configured to receive and transmit signaling data from and to a switch/association matrix to which the node 101 is communicatively connected through the data communication engine 104.

In embodiments of the present subject disclosure, the data communication engine 104 and the network management engine 103 operate in a coordinated manner for purposes of determining fronthaul network configurations according to embodiments of the present subject disclosure.

The control engine 102 includes one or more computers, each including one or more processors, which each may be any suitable microprocessor, microcontroller, Field Programmable Gate Arrays (FPGA), Application Specific Integrated Circuits (ASIC), Digital Signal Processing chip, and/or state machine, or a combination thereof. According to various embodiments, one or more of the computers can be configured as a multi-processor computer having multiple processors for providing parallel computing. The control engine 102 may also comprise, or may be in communication with, computer storage media, such as, without limitation, the memory 105, capable of storing computer program instructions or software code that, when executed by the processor, cause the processor to perform the elements described herein. In addition, the memory 105 may be any type of data storage computer storage medium, capable of storing a data structure representing a computer network to which the network node 101 belongs, coupled to the control engine 102 and operable with the data communication engine 104 and the network management engine 103 to facilitate management and processing of data stored in association therewith.

It will be appreciated that the network node 101 shown and described with reference to FIG. 9 is provided by way of example only. Numerous other architectures, operating environments, and configurations are possible. Other embodiments of the node may include fewer or greater number of components, and may incorporate some or all of the functionality described with respect to the network node components shown in FIG. 9. Accordingly, although the control engine 102, network management engine 103, data communication engine 104, and memory 105 are illustrated as part of the network node 101, no restrictions are placed on the location and control of components 102-105. In particular, in other embodiments, components 102-105 may be part of different entities or computing systems, for example as described above with respect of embodiments (centralized, semi-distributed, distributed) of the switch controller.

The methods and apparatuses according to embodiments of the present subject disclosure offer the following advantages, in particular with respect to conventional train communication systems:

The advantages of the invention with respect to state of the art in train communication system are given as the following:

The present subject disclosure proposes an adaptive architecture that improves the flexibility of the fronthaul network deployment. For example, a single deployment is able to cope with a variety of traffic intensities, through the use in some embodiments of a reconfigurable switch/association matrix and a switch controller. Conventional systems propose essentially static and non-reconfigurable switches.

The present subject disclosure further proposes means to improve the throughput offered to mobile terminals onboard a train, in particular a HST train, by adapting the fronthaul network configuration and topology to the position and speed of the train. The adaptation of the fronthaul network may be performed in some embodiments by selecting associations among central units CUs and railroad side distributed units that maximize the sum of the throughput carried out to the active DUs.

The present subject disclosure further proposes to improve the resilience of the overall network in some embodiments by setting and updating the redundancy of the fronthaul network based on the propagation conditions in the railroad and/or the speed and positions of the train.

The present subject disclosure further proposes techniques to reduce the latency of the fronthaul and fronthaul reconfiguration by means in some embodiments of selecting the fastest associations from the available CU-DU associations and by using mobile edge computing. More specifically, in some embodiments the switch controller may be located close to the switch/association matrix in order to increase the reactivity of the proposed method.

The present subject disclosure may also advantageously enable energy saving, since in some embodiments techniques are proposed for the reduction of the number of central units (CUs) involved in the CU-DU associations, thus saving also computation power for a given set of active/measurement DUs.

While the invention has been described with respect to preferred embodiments, those skilled in the art will readily appreciate that various changes and/or modifications can be made to the invention without departing from the spirit or scope of the invention as defined by the appended claims.

Although this invention has been disclosed in the context of certain preferred embodiments, it should be understood that certain advantages, features and aspects of the systems, devices, and methods may be realized in a variety of other embodiments. Additionally, it is contemplated that various aspects and features described herein can be practiced separately, combined together, or substituted for one another, and that a variety of combination and sub-combinations of the features and aspects can be made and still fall within the scope of the invention. Furthermore, the systems and devices described above need not include all of the modules and functions described in the preferred embodiments.

Information and signals described herein can be represented using any of a variety of different technologies and techniques. For example, data, instructions, commands, information, signals, bits, symbols, and chips can be represented by voltages, currents, electromagnetic waves, magnetic fields or particles, optical fields or particles, or any combination thereof.

Depending on the embodiment, certain acts, events, or functions of any of the methods described herein can be performed in a different sequence, may be added, merged, or left out all together (e.g., not all described acts or events are necessary for the practice of the method). Moreover, in certain embodiments, acts or events may be performed concurrently rather than sequentially.

The invention claimed is:

1. A method for managing a fronthaul network in a wireless communication system, the fronthaul network comprising several distributed processors and one or more central processors, wherein each distributed processor of the several distributed processors is configured to provide, under the control of a central processor of the one or more central processors, wireless communication of data between a mobile terminal and the fronthaul network, the method comprising: performing fronthaul network dynamic configuration on the fronthaul network, the fronthaul network dynamic configuration comprising, at a controller of the wireless communication system:
   obtaining information indicating a positioning of the mobile terminal;
   obtaining, based on the information indicating a positioning of the mobile terminal, a set of one or more active distributed processors among the plurality of distributed processors, wherein the one or more active distributed processors are usable by the mobile terminal for wireless communication with the fronthaul network;
   determining first associations between each of the active distributed processors and one or more first respective central processors of the one or more central processors; and
   configuring communication links between each of the active distributed processors and their first respective one or more central processors according to the determined first associations, such that communication links between distributed processors and one or more central processors are configured dynamically based on positioning of the mobile terminal.

2. The method of claim 1, wherein the configuring communication links between each of the active distributed processors and their respective one or more central processors comprises activating and/or deactivating connections in a matrix of available connections among the several distributed processors and one or more central processors of the fronthaul network.

3. The method of claim 1, wherein the determining the associations comprises determining associations that increase a data communication throughput between the mobile terminal and the fronthaul network.

4. The method of claim 1, wherein the fronthaul network dynamic configuration further comprises: configuring radio parameters of the active distributed processors to configure the active distributed processors as a Single Frequency Network.

5. The method of claim 1, wherein the determining the associations comprises determining associations that increase and/or adapt a fronthaul network resiliency for data communications between the mobile terminal and the fronthaul network.

6. The method of claim 1, wherein the information indicating a positioning of the mobile terminal comprises measurements related to a location of the mobile terminal and/or a speed of the mobile terminal, and/or a direction of movement of the mobile terminal.

7. The method of claim 1, wherein the fronthaul network dynamic configuration further comprises: transmitting fronthaul network configuration information to the mobile terminal, wherein the fronthaul network configuration information comprises information indicating the set of one or more active distributed processors.

8. A method for managing a fronthaul network in a wireless communication system, the fronthaul network comprising several distributed processors and one or more central processors, wherein each distributed processor of the several distributed processors is configured to provide, under the control of a central processor of the one or more central processors, wireless communication of data between a mobile terminal and the fronthaul network, the method comprising: performing fronthaul network dynamic configuration on the fronthaul network, the fronthaul network dynamic configuration comprising, at a controller of the wireless communication system:
   obtaining information indicating a positioning of the mobile terminal;
   obtaining, based on the information indicating a positioning of the mobile terminal, a set of one or more active distributed processors among the plurality of distributed processors, wherein the one or more active distributed processors are usable by the mobile terminal for wireless communication with the fronthaul network;
   determining first associations between each of the active distributed processors and one or more first respective central processors of the one or more central processors; and
   configuring communication links between each of the active distributed processors and their first respective one or more central processors according to the determined first associations,
   wherein the fronthaul network dynamic configuration is performed iteratively in a fronthaul network dynamic configuration loop.

9. The method of claim 8, wherein an iteration of the fronthaul network dynamic configuration loop is executed periodically.

10. The method of claim 8, wherein a trajectory of the mobile terminal is divided into portions, and wherein an iteration of the fronthaul network dynamic configuration loop is executed for each portion of the trajectory.

11. A method for managing a fronthaul network in a wireless communication system, the fronthaul network comprising several distributed processors and one or more central processors, wherein each distributed processor of the several distributed processors is configured to provide, under the control of a central processor of the one or more central processors, wireless communication of data between a mobile terminal and the fronthaul network, the method comprising: performing fronthaul network dynamic configuration on the fronthaul network, the fronthaul network dynamic configuration comprising, at a controller of the wireless communication system:
   obtaining information indicating a positioning of the mobile terminal;

obtaining, based on the information indicating a positioning of the mobile terminal, a set of one or more active distributed processors among the plurality of distributed processors, wherein the one or more active distributed processors are usable by the mobile terminal for wireless communication with the fronthaul network;

determining first associations between each of the active distributed processors and one or more first respective central processors of the one or more central processors; and configuring communication links between each of the active distributed processors and their first respective one or more central processors according to the determined first associations, wherein the fronthaul network dynamic configuration further comprises: transmitting fronthaul network configuration information to the mobile terminal, wherein the fronthaul network configuration information comprises information indicating the set of one or more active distributed processors, wherein the fronthaul network dynamic configuration further comprises: obtaining, based on the information indicating a positioning of the mobile terminal, on information indicating a speed of the mobile terminal, and information indicating a direction of movement of the mobile terminal, a set of one or more measurement distributed processors among the plurality of distributed processors, to be used by the mobile terminal for radio measurements on wireless links between the mobile terminal and the measurement distributed processors, wherein the fronthaul network configuration information comprises information indicating the set of one or more measurement distributed processors.

12. The method of claim 11, wherein the fronthaul network dynamic configuration further comprises: determining second associations between at least one of the measurement distributed processors and one or more second respective central processors of the one or more central processors, and configuring communication links between each of the at least one measurement distributed processors and their second respective one or more central processors according to the determined second associations.

13. An apparatus, the apparatus comprising a processor, a memory operatively coupled to the processor, and network interfaces to communicate in a wireless communication system, wherein the apparatus is configured to perform the method according to claim 1.

14. A non-transitory computer-readable medium storing computer program code, said computer program code comprising instructions to, when provided to a computer system and executed, cause said computer to perform the method according to claim 1.

* * * * *